US009832325B2

(12) United States Patent
Nagasawa

(10) Patent No.: US 9,832,325 B2
(45) Date of Patent: Nov. 28, 2017

(54) INFORMATION PROCESSING APPARATUS AND STORAGE MEDIUM

(71) Applicant: Yuichi Nagasawa, Kanagawa (JP)

(72) Inventor: Yuichi Nagasawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/069,090

(22) Filed: Mar. 14, 2016

(65) Prior Publication Data

US 2016/0277599 A1 Sep. 22, 2016

(30) Foreign Application Priority Data

Mar. 18, 2015 (JP) .................................. 2015-055122

(51) Int. Cl.
*H04N 1/00* (2006.01)
*G06K 9/03* (2006.01)
*G06K 9/00* (2006.01)

(52) U.S. Cl.
CPC ......... *H04N 1/00084* (2013.01); *G06K 9/03* (2013.01); *H04N 1/00007* (2013.01); *H04N 1/00037* (2013.01); *H04N 1/00127* (2013.01); *H04N 1/00896* (2013.01); *G06K 9/00771* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,254,800 B2 | 8/2012 | Oyoshi | |
| 8,578,185 B2 | 11/2013 | Azuma et al. | |
| 8,924,759 B2 | 12/2014 | Miki et al. | |
| 2012/0204046 A1* | 8/2012 | Baba | G06F 1/3231 713/323 |
| 2013/0128298 A1 | 5/2013 | Yamada | |
| 2015/0006927 A1* | 1/2015 | Ono | G06F 1/3231 713/320 |

FOREIGN PATENT DOCUMENTS

| | | |
|---|---|---|
| JP | H08-059042 | 3/1994 |
| JP | 5104937 | 12/2012 |

(Continued)

*Primary Examiner* — Fan Zhang
(74) *Attorney, Agent, or Firm* — Harness, Dickey & Pierce, P.L.C.

(57) ABSTRACT

An information processing apparatus includes a plurality of human body detecting sensors that detect a user, each of the human body detecting sensors having a detection area for detecting the presence of the user; an operation part that receives an operation by the user; and an erroneous detection determination part that determines an erroneous detection if the operation part does not receive the operation by the user within a predetermined time after one of the human body detecting sensors detects the presence of the user. If a number of erroneous detections of the one of the human body detecting sensors is equal to or more than a first threshold, the erroneous detection determination part sends an instruction to reduce the detection area to the one of the human body detecting sensors and sends an instruction to increase the detection area to another one of the human body detecting sensors.

27 Claims, 13 Drawing Sheets

(56) References Cited

FOREIGN PATENT DOCUMENTS

| JP | 2013-065974 | 4/2013 |
| JP | 2013-109196 | 6/2013 |
| JP | 2013-186211 | 9/2013 |
| JP | 5300451 | 9/2013 |
| JP | 2013-230688 | 11/2013 |
| JP | 5573822 | 8/2014 |

* cited by examiner

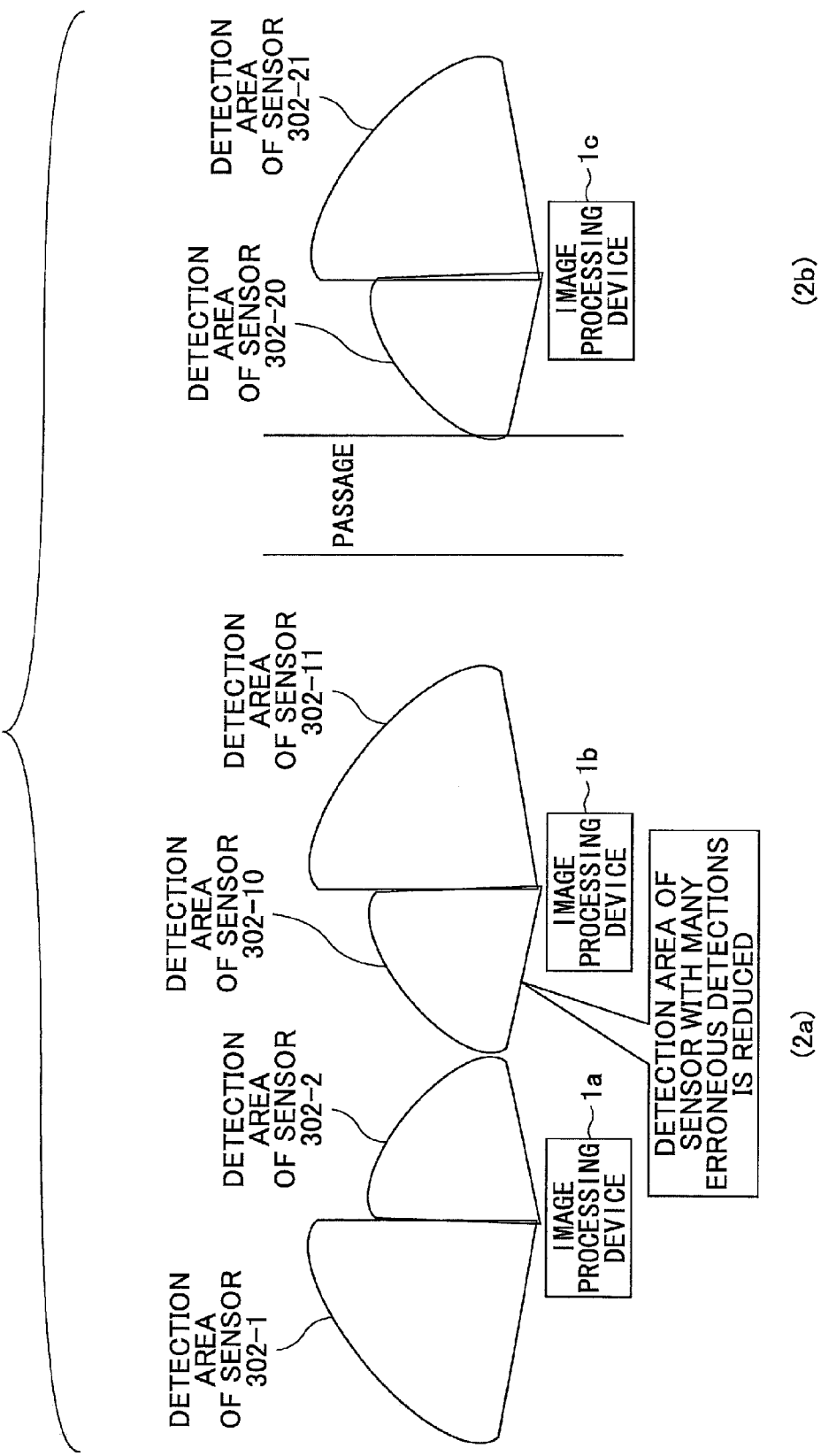

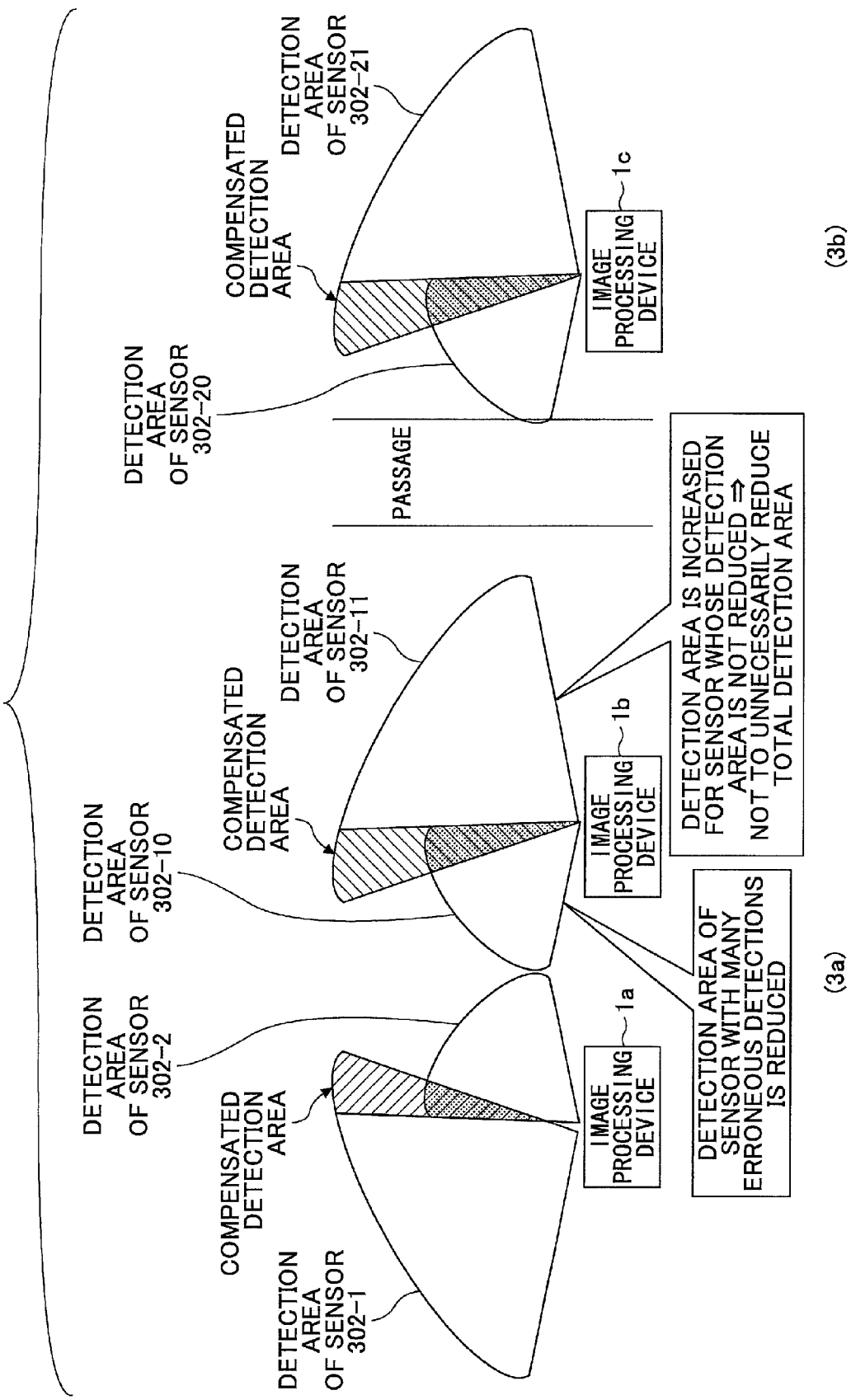

FIG.11

| NUMBER OF TIMES OF EXCEEDING FIRST THRESHOLD | REDUCTION WIDTH OF DETECTION AREA OF ONE HUMAN BODY DETECTING SENSOR 302 | INCREASE WIDTH OF DETECTION AREA OF THE OTHER HUMAN BODY DETECTING SENSOR 302 |
|---|---|---|
| 1-5 TIMES | 1 STEP | 1 STEP |
| 6-10 TIMES | 2 STEPS | 2 STEPS |
| 11 TIMES OR MORE | 3 STEPS | 3 STEPS |

INFORMATION PROCESSING APPARATUS AND STORAGE MEDIUM

BACKGROUND OF THE INVENTION

1. Field of the Invention

The present invention relates to an information processing apparatus and a storage medium 2. Description of the Related Art There are image processing devices such as printers or multifunction peripherals that include a human body detecting sensor. The image processing devices that include the human body detecting sensor start a process to return from an energy-saving mode upon detecting approach of a user. In accordance with this, it is possible to reduce a waiting time of the user.

In order to prevent detection of a human that passes by an image processing device as a user, there are image processing devices that include a human body detecting sensor and automatically adjust a detection area (distance or angle) from detection history of the sensor and operation history of the image processing device (Patent Document 1, for example).

For example, if there are many erroneous detections, the detection area may be reduced.

However, in the method of the related art, when the detection area is automatically adjusted, the detection area is adjusted without consideration of a direction where an erroneous detection has occurred. Accordingly, the detection area is also reduced in a direction where the erroneous detection has not occurred, so that approach of the user may not be accurately detected. As a result of this, the start of the process to return from the energy-saving mode may be delayed and the waiting time of the user may be long.

RELATED ART DOCUMENTS

[Patent Document 1] Japanese Patent No. 5300451

SUMMARY OF THE INVENTION

In an embodiment of the present invention, an information processing apparatus is provided. The information processing apparatus includes a plurality of human body detecting sensors that detect presence of a user, in which each of the human body detecting sensors has a detection area for detecting the presence of the user; an operation part that receives an operation by the user; and an erroneous detection determination part that determines an erroneous detection if the operation part does not receive the operation by the user within a predetermined time after one of the human body detecting sensors detects the presence of the user. If a number of erroneous detections of the one of the human body detecting sensors is equal to or more than a first threshold, the erroneous detection determination part sends an instruction to reduce the detection area to the one of the human body detecting sensors and sends an instruction to increase the detection area to another one of the human body detecting sensors.

BRIEF DESCRIPTION OF THE DRAWINGS

Other objects and further features of embodiments will become apparent from the following detailed description when read in conjunction with the accompanying drawings, in which:

FIG. 4B is a diagram illustrating setting of a detection area of the image processing device 1 according to the embodiment;

FIG. 4C is a diagram illustrating setting of a detection area of the image processing device 1 according to the embodiment;

FIG. 11 is a diagram showing a relationship between a number of times of exceeding a first threshold and a number of steps of reducing or increasing a detection area according to the embodiment.

DESCRIPTION OF THE PREFERRED EMBODIMENTS

In the following, an embodiment of the present invention will be described in detail.

First Embodiment

<Overall Configuration of System>

With reference to the drawings, an image processing device and a detection area of a human body detecting sensor according to the embodiment are described.

Figure 1:
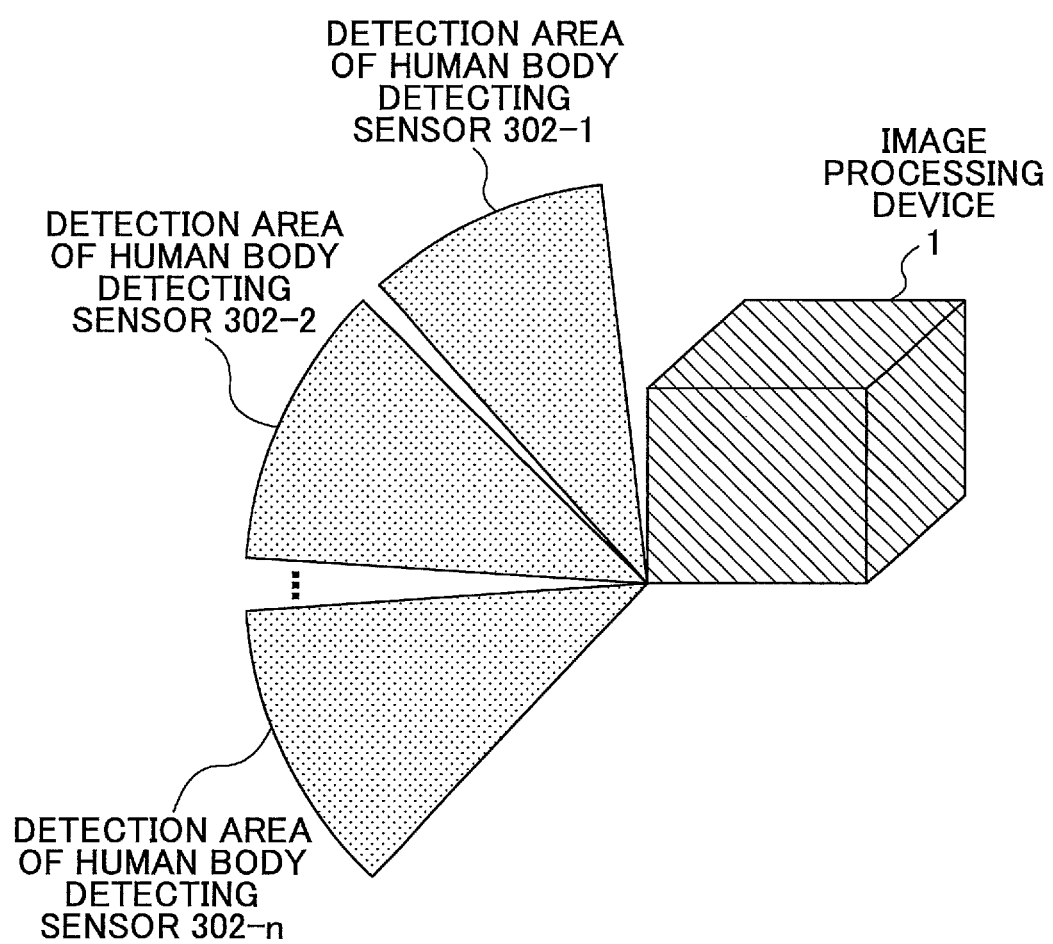
FIG. 1 is a diagram illustrating an image processing device 1 and a detection area of a human body detecting sensor according to an embodiment.

FIG. 1 is a diagram illustrating an image processing device 1 and a detection area of a human body detecting sensor according to the embodiment. The image processing device 1 has a plurality of human body detecting sensors 302. The human body detecting sensors 302 form detection areas for detecting a human.

The detection areas are formed by the corresponding the human body detecting sensors 302. In the case of FIG. 1, n detection areas are formed (n is a given integer). The detection areas formed by the human body detecting sensors 302 may be overlapped. Further, a size, a direction, and the like of the detection areas for the image processing device 1 may be set by an administrator of the image processing device 1. Further, the size, the direction, and the like of the detection areas may also be set automatically by the image processing device 1 from detection history of a human, operation history of a user, or the like.

The number of the human body detecting sensors 302 that the image processing device 1 simultaneously operates is not limited in particular.

<Hardware Configuration>

Figure 2:
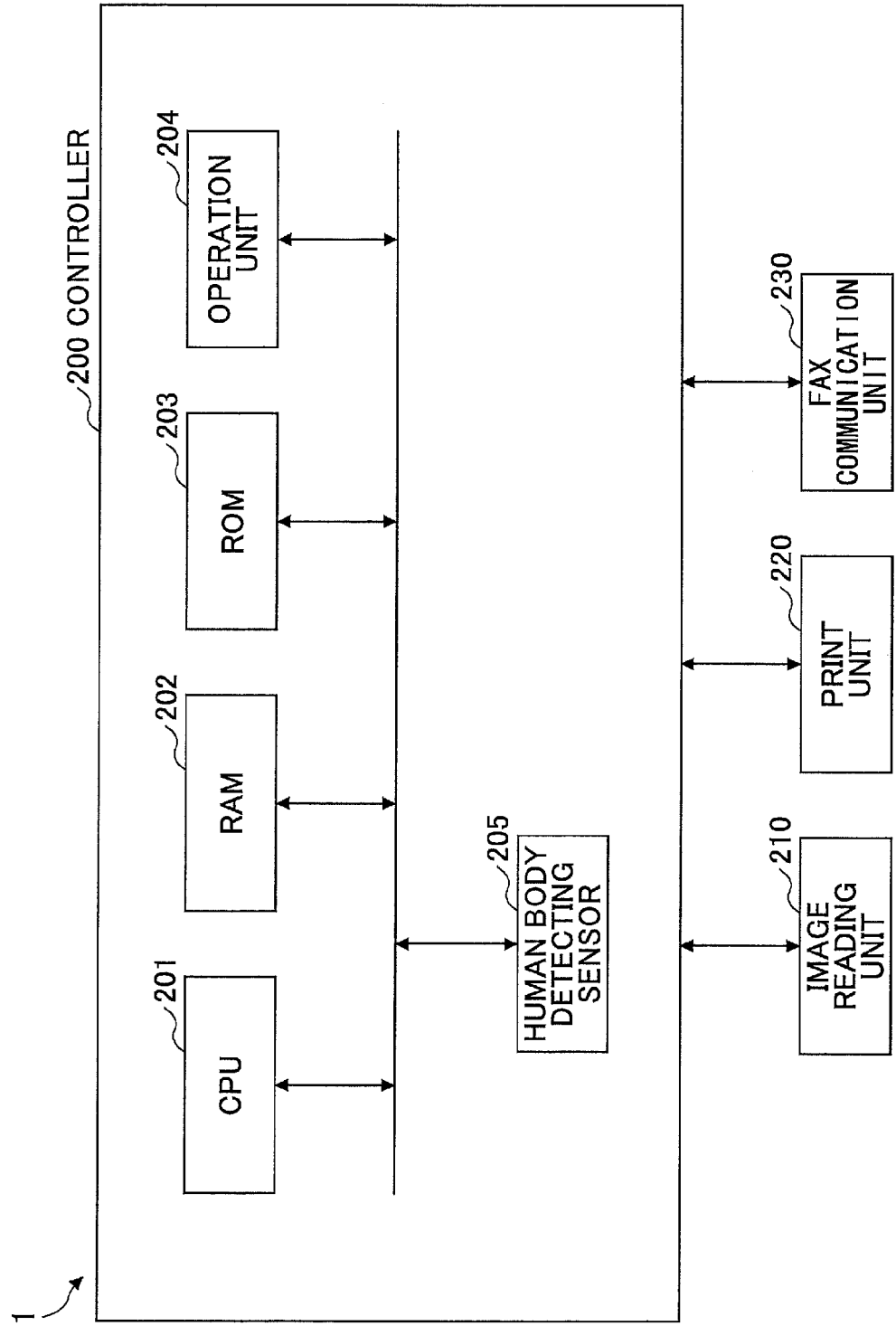
FIG. 2 is a diagram of a hardware configuration of the image processing device 1 according to the embodiment.

With reference to FIG. 2, a hardware configuration of the image processing device 1 according to the embodiment is described. FIG. 2 is a diagram of a hardware configuration of the image processing device 1 according to the embodiment.

The image processing device 1 includes a controller 200, an image reading unit 210, a print unit 220, and a FAX communication unit 230.

The controller 200 includes a Central Processing Unit (CPU) 201, a Random Access Memory (RAM) 202, a Read-Only Memory (ROM) 203, an operation unit 204, and a human body detecting sensor 205.

The CPU 201 performs an arithmetic operation and control for each process performed by the image processing device 1. For example, the CPU 201 executes various programs. In addition, the CPU 201 may be configured with a plurality of CPUs, devices, or a plurality of cores in order to speed up by parallel processing.

When the CPU 201 receives a report from the human body detecting sensor 205 that a human is detected, the CPU 201 starts a process to return to a normal operation mode from an energy-saving mode in cooperation with the image reading unit 210, the print unit 220, and the FAX communication unit 230.

The energy-saving mode refers to an operation mode for reducing energy consumption by limiting a part of functions when the user does not use the image processing device 1.

The RAM 202 and the ROM 203 are examples of a storage device. The ROM 203 stores a program executed by the CPU 201, data, or parameters, for example. The RAM 202 stores, when the CPU 201 executes a program, for example, the program, data used by the program, and data or parameters created by the program. In addition, the image processing device 1 may include an auxiliary storage device such as a hard disk.

The operation unit 204 receives an instruction to the image processing device 1 from the user and reports received contents to the CPU 201. The CPU 201 performs control in response to the instruction to the image processing device 1 received via the operation unit 204.

The human body detecting sensor 205 forms a detection area for detecting a human. The human body detecting sensor 205 determines a size and a direction of the detection area in accordance with an instruction from the CPU 201.

Further, the human body detecting sensor 205 reports to the CPU 201 if a human is detected.

The image reading unit 210 is used when the image processing device 1 provides a scanner function. The image reading unit 210 performs a scanning process in accordance with an instruction from the controller 200.

The print unit 220 is used when the image processing device 1 provides a print function. The print unit 220 performs a print process in accordance with an instruction from the controller 200.

The FAX communication unit 230 is used when the image processing device 1 provides a FAX transmission or reception function. The FAX communication unit 230 performs a FAX transmission or reception function in accordance with an instruction from the controller 200.

<Functional Configuration>

Figure 3:
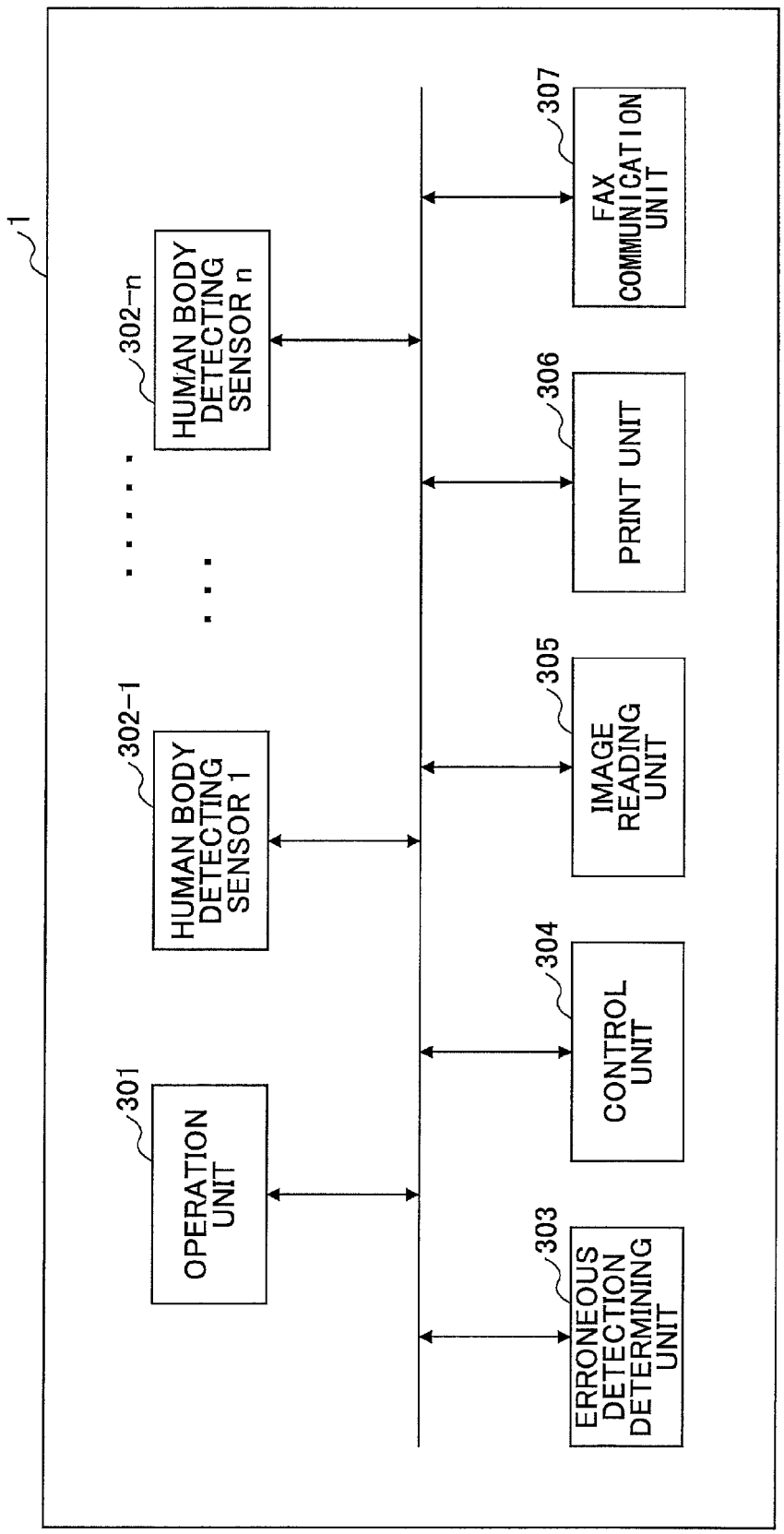
FIG. 3 is a diagram of a functional configuration of the image processing device 1 according to the embodiment.

With reference to FIG. 3, a functional configuration of the image processing device 1 according to the embodiment is described. FIG. 3 is a diagram of the functional configuration of the image processing device 1 according to the embodiment.

The image processing device 1 includes an operation unit 301, human body detecting sensors 302 (302-1 to 302-n), an erroneous detection determining unit 303, a control unit 304, an image reading unit 305, a print unit 306, and a FAX communication unit 307.

The operation unit 301 receives an instruction to the image processing device 1 from the user and reports received contents to the control unit 304. Further, the operation unit 301 reports, to the erroneous detection determining unit 303, that the instruction is received from the user.

The human body detecting sensors 302 form a detection area in accordance with an instruction from the control unit 304. The detection area can be set with predetermined direction and size. Further, if the human body detecting sensor 302 detects a human, the human body detecting sensor 302 reports, to the control unit 304 and the erroneous detection determining unit 303, that the human is detected.

The erroneous detection determining unit 303 receives, from the human body detecting sensor 302, the report that the human is detected. Further, the erroneous detection determining unit 303 receives, from the operation unit 301, the report that the instruction is received from the user.

If the operation unit 301 does not receive an instruction from the user within a predetermined time since the human body detecting sensor 302 detects the human, the erroneous detection determining unit 303 determines that the detection of the human is an erroneous detection. If the erroneous detection determining unit 303 determines the erroneous detection, the erroneous detection determining unit 303 counts and stores the number of erroneous detections. For example, the erroneous detection determining unit 303 determines the erroneous detection if the erroneous detection determining unit 303 does not receive, from the operation unit 301, the report that the instruction is received from the user within a predetermined time since the erroneous detection determining unit 303 receives, from the human body detecting sensor 302, the report that the human is detected.

In addition, the erroneous detection determining unit 303 stores the number of erroneous detections for each human body detecting sensor 302.

The predetermined time may be set for each image processing device 1. While the predetermined time depends on a detection area, the predetermined time is preferably set to be about 2, 3 to 10 seconds.

The erroneous detection determining unit 303 stores the number of erroneous detections in a predetermined period and compares the number of erroneous detections with a threshold for reducing the detection area (hereafter "first threshold") and a threshold for increasing the detection area (hereafter "second threshold"). In accordance with a result of the comparison, the erroneous detection determining unit 303 controls the human body detecting sensor 302 in cooperation with the control unit 304, such that the detection area of the human body detecting sensor 302 is changed.

For example, if the number of erroneous detections of the human body detecting sensor 302-1 in the predetermined period exceeds the first threshold, the erroneous detection determining unit 303 performs control in cooperation with the control unit 304 such that the detection area of the human body detecting sensor 302-1 is reduced. Further, in this case, the erroneous detection determining unit 303 may perform control in cooperation with the control unit 304 such that the detection area of the human body detecting sensor 302-2 is increased.

Whether to increase the detection area of the human body detecting sensor 302-2 may be determined by comparing the number of erroneous detections of the human body detecting sensor 302-2 in the predetermined period with the second threshold. For example, if the number of erroneous detections of the human body detecting sensor 302-2 is less than the second threshold, the erroneous detection determining unit 303 may perform control in cooperation with the control unit 304 such that the detection area is increased.

Further, when the number of erroneous detections of the human body detecting sensor 302-2 in the predetermined period is compared with the second threshold, if the number of erroneous detections of the human body detecting sensor 302-2 is equal to or more than the second threshold, the erroneous detection determining unit 303 may change an angle of the human body detecting sensor 302-2 while maintaining a size of the detection area of the human body detecting sensor 302-2 in cooperation with the control unit 304. When the angle of the human body detecting sensor 302-2 is adjusted and detection area of the human body detecting sensor 302-1 is reduced, the detection areas may be optimized.

In addition, when a reduction width or an increase width of the detection area is determined, the erroneous detection determining unit 303 may determine the width in consideration of a difference between the first threshold and the number of erroneous detections or a difference between the second threshold and the number of erroneous detections.

The erroneous detection determining unit 303 may increase the detection area from the number of erroneous detections and the second threshold in because if the number of erroneous detections is small, the detection area may be too small, so that a start of a return from the energy-saving mode may not be performed at an appropriate time.

The control unit 304 receives an instruction from the user via the operation unit 301 and provides various functions to the user in cooperation with the image reading unit 305, the print unit 306, and the FAX communication unit 307.

The control unit 304 further receives an instruction from the user via the operation unit 301 and performs various types of settings for the image processing device 1. For example, upon receiving an instruction from the user, the control unit 304 performs an initial setting of the detection areas of the human body detecting sensors 302.

The control unit 304 also adjusts the detection areas of the human body detecting sensors 302 in cooperation with the erroneous detection determining unit 303.

The control unit 304 receives, from the human body detecting sensor 302, a report that a human is detected. In this case, if the image processing device 1 is operating in the energy-saving mode, the control unit 304 starts a process to return to a normal mode from the energy-saving mode.

The image reading unit 305 provides a scanner function to the user in cooperation with the control unit 304.

The print unit 220 provides a print function to the user in cooperation with the control unit 304.

The FAX communication unit 307 provides a FAX transmission or reception function to the user in cooperation with the control unit 304.

<Adjustment of Detection Area>

Figure 4A:
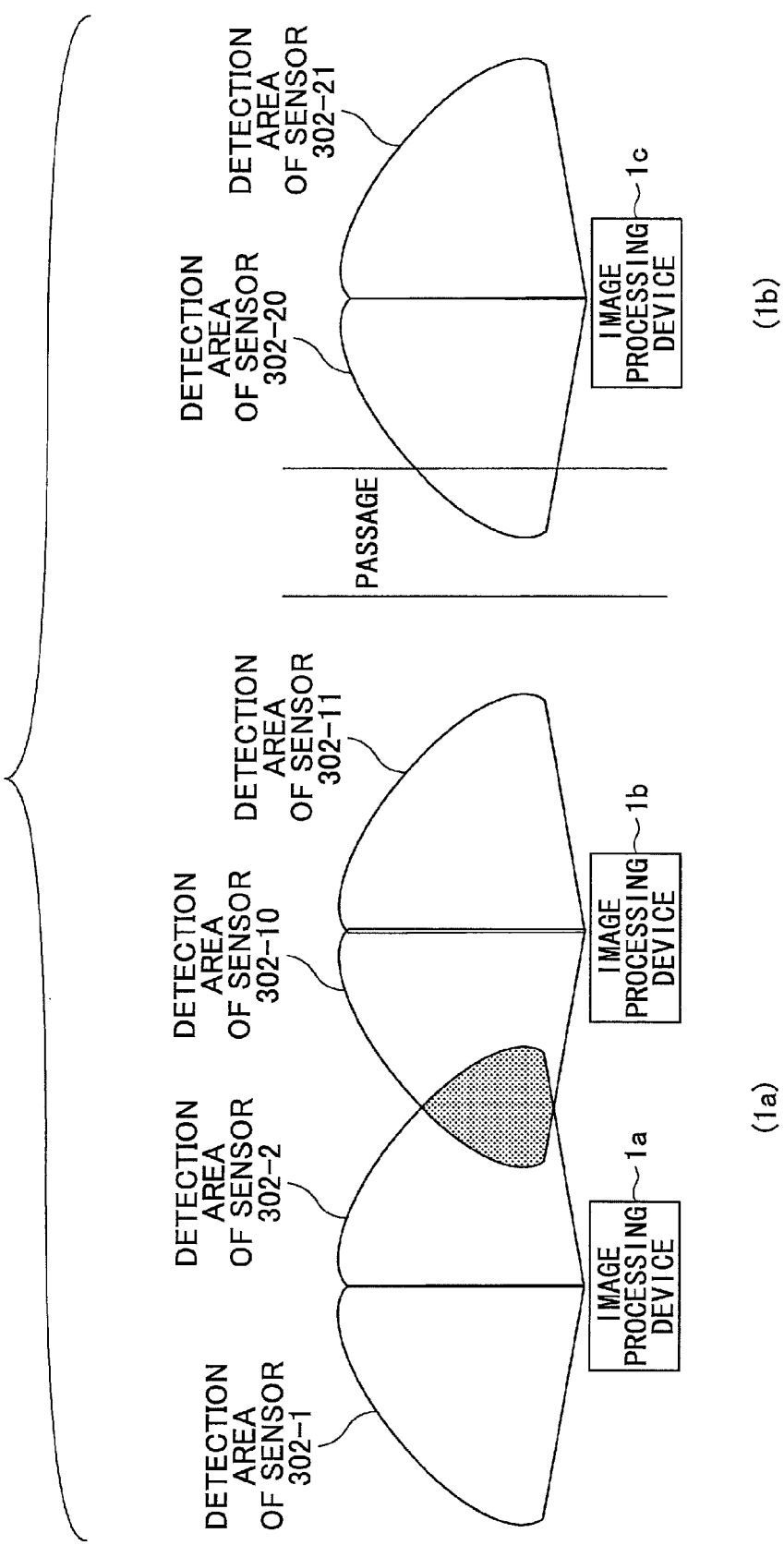
FIG. 4A is a diagram illustrating setting of a detection area of the image processing device 1 according to the embodiment.

With reference to FIGS. 4A to 4C, setting of detection areas in the image processing device 1 according to the embodiment is described. FIGS. 4A to 4C are diagrams illustrating the setting of the detection areas of the image processing device 1 according to the embodiment.

FIG. 4A-(1a) and (1b) show setting of detection areas where an erroneous detection is likely to occur.

In FIG. 4A-(1a), detection areas are formed by the human body detecting sensors 302 of two devices including an image processing device 1a and an image processing device 1b. A detection area formed by the human body detecting sensor 302-2 and a detection area formed by a human body detecting sensor 302-10 are overlapping each other.

Since the detection areas of different image processing devices are overlapping, the user of the image processing device 1a may be detected by the human body detecting sensor 302-10 of the image processing device 1a or the user of the image processing device 1b may be detected by the human body detecting sensor 302-2. One of these cases is determined as an erroneous detection by the image processing device 1a or the image processing device 1b.

In FIG. 4A-(1b), the detection area formed by the human body detecting sensor 302 of an image processing device 1c extends over a passage. In this case, the image processing device 1c detects not only the user of the image processing device 1c but also a person walking in the passage. The person walking in the passage is determined as an erroneous detection by the image processing device 1c.

FIG. 4B-(2a) and (2b) show setting of detection areas for reducing erroneous detections.

FIG. 4B-(2a) shows the setting of detection areas in which the overlap of detection areas is eliminated, so that an erroneous detection is not likely to occur. Specifically, the detection areas of the human body detecting sensor 302-2 and the human body detecting sensor 302-10 are reduced to eliminate the overlap of the detection areas.

Further, FIG. 4B-(2b) shows the setting of a detection area in which the detection area is not set on the passage, so that an erroneous detection is not likely to occur. Specifically, the detection area of a human body detecting sensor 302-20 in the image processing device 1c is reduced and formed so as not to extend over the passage.

Although the settings shown in FIG. 4B-(2a) and (2b) provide effects of reducing erroneous detections, the detection areas are reduced on the whole. Accordingly, human body detection may be delayed. As a result of this, the start of a process to switch from the power-saving mode to the normal mode may be delayed.

FIG. 4C-(3a) and (3b) show setting of detection areas by which quality of human body detection is maintained while erroneous detections are reduced.

FIG. 4C-(3a) shows setting of detection areas by which quality of human body detection is maintained while the overlap of detection areas between different image processing devices 1 is eliminated. In FIG. 4A-(1a), the overlapping detection area of the human body detecting sensor 302-2 in the image processing device 1a is reduced and the overlapping detection area of the human body detecting sensor 302-10 in the image processing device 1b is reduced. Further, a detection area of the human body detecting sensor 302-1 in the image processing device 1a is increased. Specifically, an adjustment is made to compensate for the reduced detection area of the human body detecting sensor 302-2 by making a distance and a direction detected by the human body detecting sensor 302-1 overlap with the detection area of the human body detecting sensor 302-2. The detection area of a human body detecting sensor 302-11 in the image processing device 1b is also increased in the same manner. FIG. 4C-(3a) shows the detection areas compensated by the human body detecting sensor 302-1 and the human body detecting sensor 302-11.

FIG. 4C-(3b) shows setting of a detection area by which quality of human body detection is maintained while the detection area is narrowed so as not to set the detection area on the passage. The detection area of the human body detecting sensor 302-20 in the image processing device 1c is reduced so as not to extend over the passage. Further, the detection area of a human body detecting sensor 302-21 in the image processing device 1c is increased. Specifically, an adjustment is made to compensate for the reduced detection area of the human body detecting sensor 302-20 by making a distance and a direction detected by the human body detecting sensor 302-21 overlap the detection area of the human body detecting sensor 302-20. FIG. 4C-(3b) shows the detection area compensating the human body detecting sensor 302-21.

According to the settings shown in FIG. 4C-(3a) and (3b), if the image processing device 1 is disposed at a place where an erroneous detection is likely to occur, the detection area of one human body detecting sensor 302 is reduced while the detection area of another human body detecting sensor 302 is increased. Specifically, an adjustment is made to compensate for the reduced detection area of the one human body detecting sensor 302 with the detection area of the other human body detecting sensor 302 by making a distance and a direction detected by the other human body detecting sensor 302 overlap the detection area of the one human body detecting sensor 302 before the reduction.

In accordance with this, it is possible to reduce effects on time of a process to switch from the power-saving mode to the normal mode, which results from the reduction of the detection area of the one human body detecting sensor 302.

<Operation Procedure>

With reference to FIGS. 5 to 11, an operation procedure of the image processing device 1 according to the embodiment is described.

(Procedure for Determining Erroneous Detection)

Figure 5:
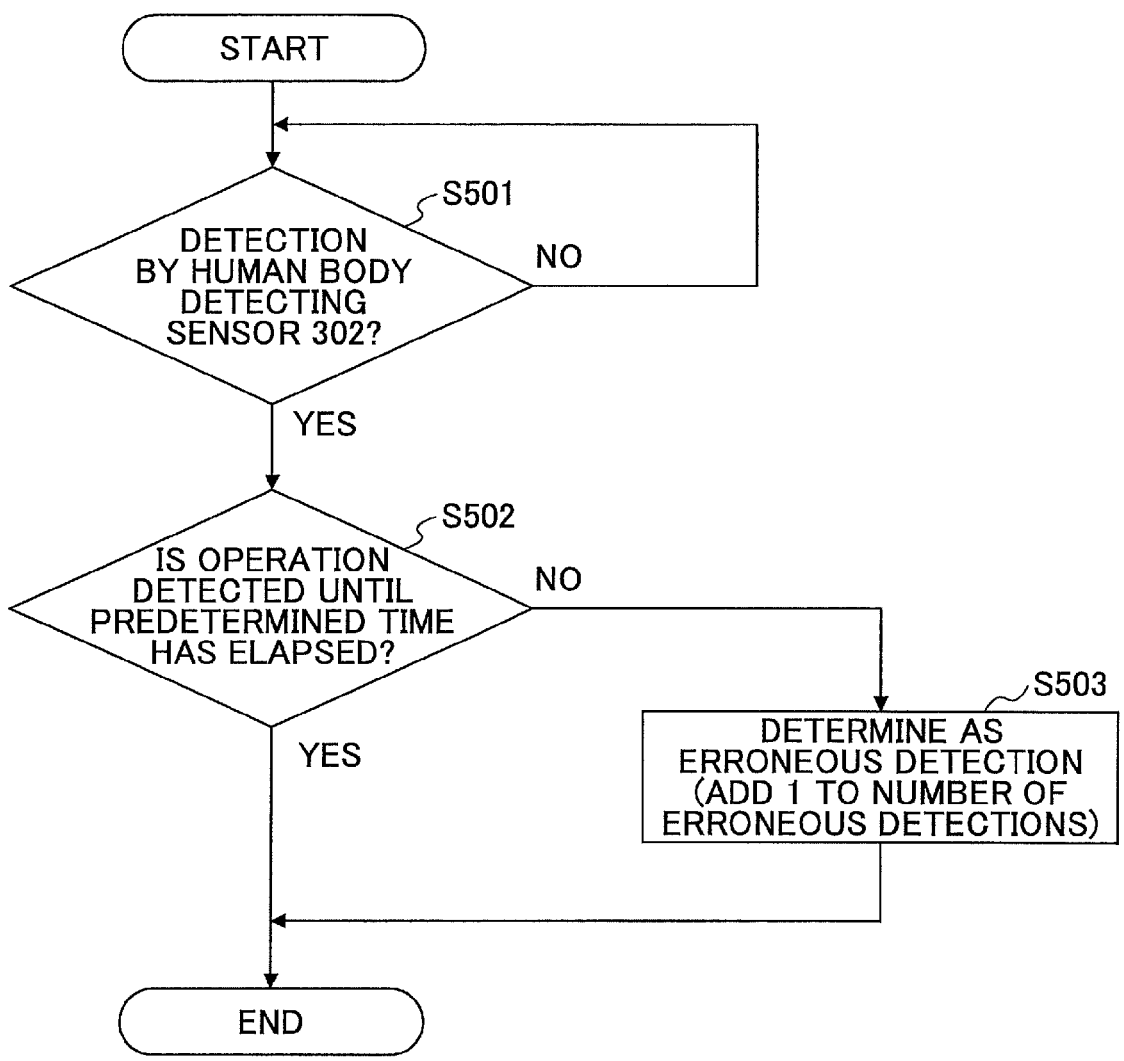
FIG. 5 is a flowchart showing a procedure for determining an erroneous detection by the image processing device 1 according to the embodiment.

FIG. 5 is a flowchart showing a procedure for determining an erroneous detection by the image processing device 1 according to the embodiment.

In step S501, the human body detecting sensor 302 of the image processing device 1 monitors a state of the detection area. If the human body detecting sensor 302 detects a human (YES in step S501), the process proceeds to step S502. By contrast, if the human body detecting sensor 302 does not detect a human (NO in step S501), the human body detecting sensor 302 maintains monitoring the detection area.

In step S502, the image processing device 1 monitors an operation on the operation unit 204 by the user before a predetermined time has elapsed.

In step S502, if an operation on the operation unit 204 by the user is detected before the predetermined time has elapsed (YES in step S502), the image processing device 1 ends the process.

In step S502, if an operation on the operation unit 204 by the user is not detected even when the predetermined time has elapsed (NO in step S502), the process proceeds to step S503.

In step S503, the image processing device 1 determines the process as an erroneous detection, adds 1 to the number of erroneous detections, and stores the number of erroneous detections. The number of erroneous detections is stored for each human body detecting sensor 302.

A fixed value may be set for the predetermined time. Alternatively, the predetermined time may be set by calculating an approximate time from the detection of the human to a start of the operation of the operation unit 204 based on a human walking speed and the detection area.

(Procedure for Adjusting Detection Area)

Figure 6:
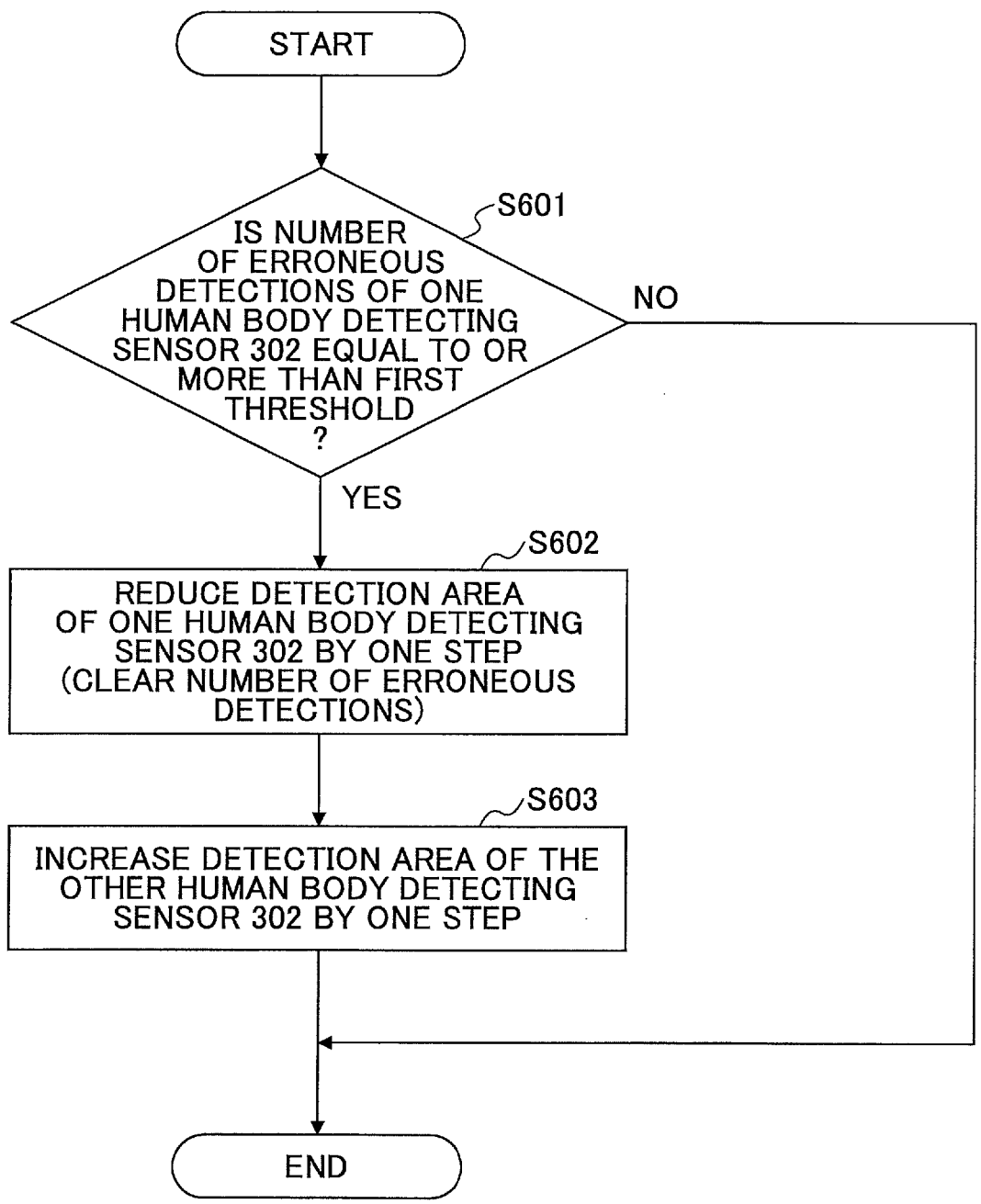
FIG. 6 is a flowchart showing a procedure for adjusting a detection area by the image processing device 1 according to the embodiment.

FIG. 6 is a flowchart showing a procedure for adjusting the detection area by the image processing device 1 according to the embodiment.

In step S601, the image processing device 1 determines whether the number of erroneous detections of one human body detecting sensor 302 is equal to or more than the threshold for reducing the detection area (the first threshold). If the number of erroneous detections is less than the first threshold (NO in step S601), the process ends. By contrast, if the number of erroneous detections is equal to or more than the first threshold (YES in step S601), the process proceeds to step S602.

In step S602, the image processing device 1 reduces the detection area of the one human body detecting sensor 302 by one step. Further, the image processing device 1 clears the number of erroneous detections of the one human body detecting sensor 302. In other words, the image processing device 1 sets the number of erroneous detections to 0.

In step S603, the image processing device 1 increases the detection area of another human body detecting sensor 302 by one step. In addition, the other human body detecting sensor 302 may include a plurality of human body detecting sensors 302.

The image processing device 1 performs this procedure for each human body detecting sensor 302. Further, the image processing device 1 may periodically have this procedure performed. For example, the procedure may be performed once in an hour or once one in a day. Alternatively, the image processing device 1 may perform this procedure at a time when the human body detecting sensor 302 detects a human, or at a time when an erroneous detection occurs.

When the detection area is increased in step S603, the image processing device 1 adjusts a detection distance and a detection angle. Upon adjusting the detection distance, the image processing device 1 may adjust sensitivity of the human body detecting sensor 302. The adjustment of sensitivity may include adjustment of an output gain of the human body detecting sensor 302 or adjustment of a threshold for human body detection.

In the following, a method for adjusting the detection angle is described. If the detection angle of the human body detecting sensor 302 is set in association with a plurality of bits, the detection angle may be adjusted by adjusting an effective number of bits. Alternatively, if a window to adjust the detection area of the human body detecting sensor 302 is set, a width of the window may be adjusted.

The first threshold may be set by the user or may be set in advance in the image processing device 1.

Figure 7:
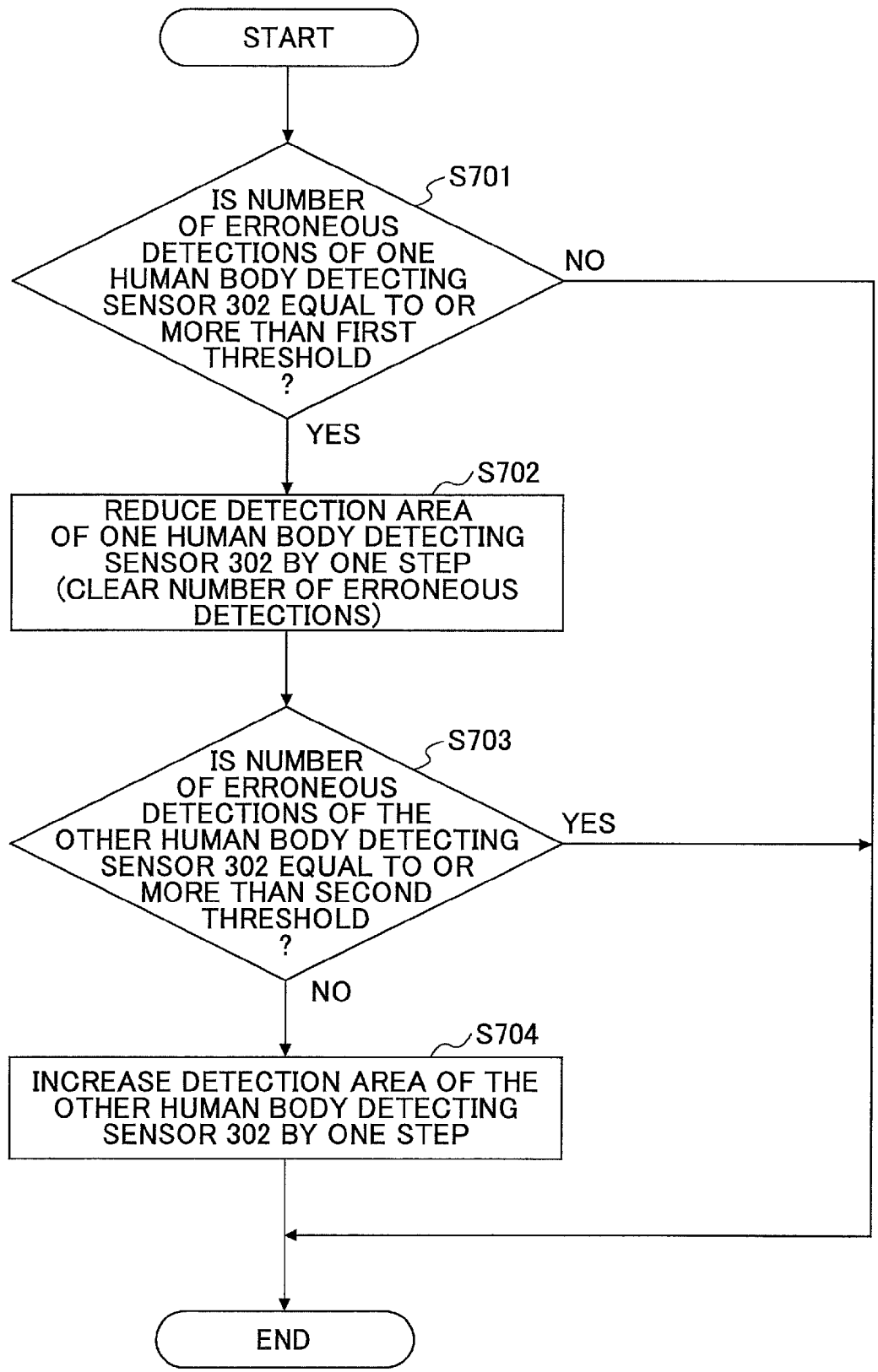
FIG. 7 is a flowchart showing a procedure for adjusting a detection area by the image processing device 1 according to the embodiment.

FIG. 7 is a flowchart showing a procedure for adjusting the detection area by the image processing device 1 according to the embodiment.

Since step S701 and step S702 are the same as step S601 and step S602, descriptions thereof are omitted.

In step S703, the image processing device 1 determines whether the number of erroneous detections of the other human body detecting sensor 302 is equal to or more than the threshold for increasing the detection area (the second threshold).

If the number of erroneous detections is equal to or more than the second threshold (YES in step S703), the process ends. In other words, while the detection area of the one human body detecting sensor 302 is reduced by one step, the detection area of the other human body detecting sensor 302 is not changed.

By contrast, if the number of erroneous detections is less than the second threshold (NO in step S703), the process proceeds to step S704.

In step S704, the image processing device 1 increases the detection area of the other human body detecting sensor 302 by one step.

By comparing the second threshold with the number of erroneous detections, it is possible to prevent increasing the detection area if the number of erroneous detections of the other human body detecting sensor 302 is great.

The second threshold may be set by the user or may be set in advance in the image processing device 1.

Figure 8:
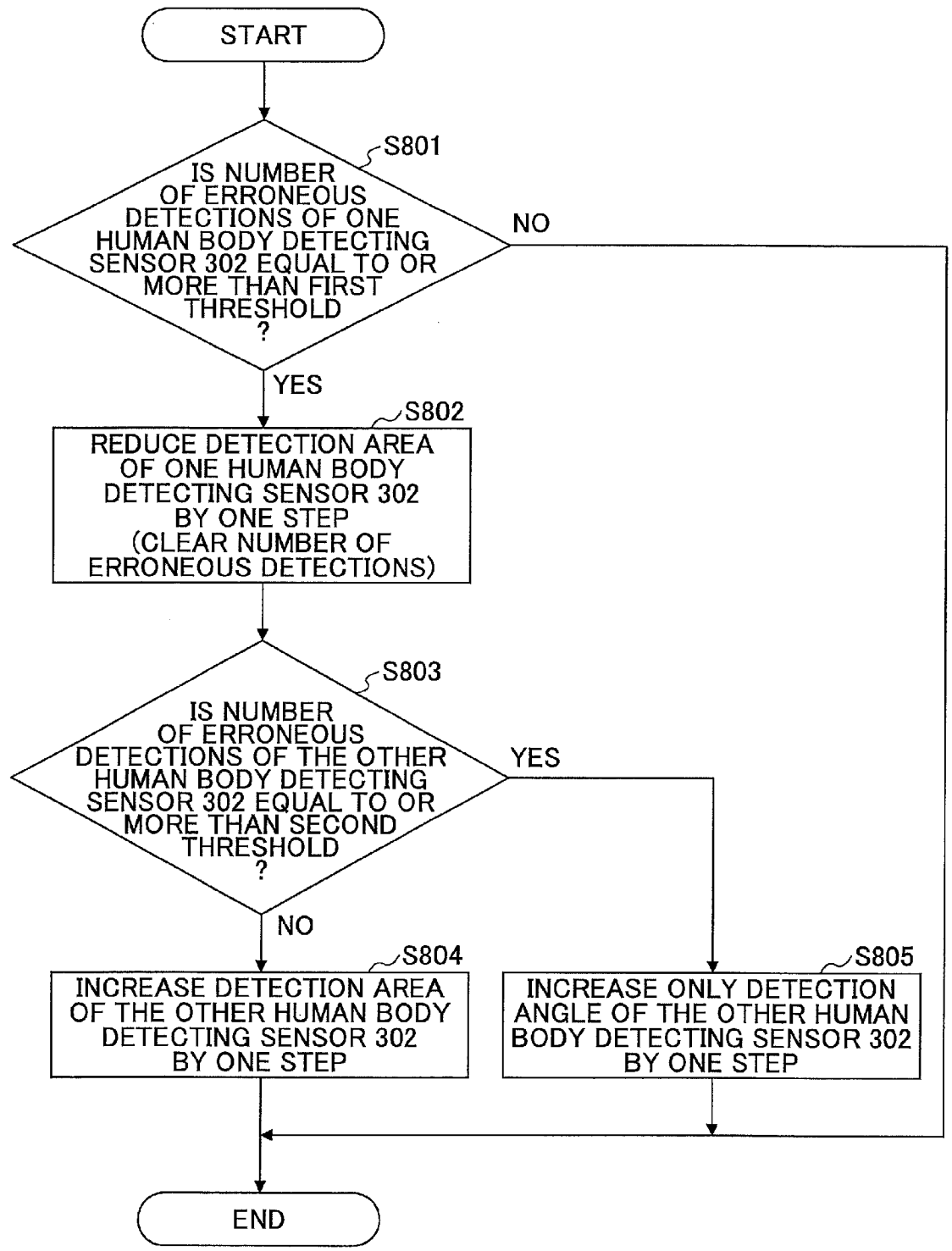
FIG. 8 is a flowchart showing a procedure for adjusting a detection area by the image processing device 1 according to the embodiment.

FIG. 8 is a flowchart showing a procedure for adjusting the detection area by the image processing device 1 according to the embodiment.

Since steps S801 to S804 are the same as steps S701 to S704, descriptions thereof are omitted.

The procedure for adjusting the detection area shown in FIG. 8 is different from the procedure for adjusting shown in FIG. 7 in that step S805 is performed if the number of erroneous detections of the other human body detecting sensor 302 is equal to or more than the second threshold in step S803 (YES in step S803).

In Step S805, the image processing device 1 increases the detection angle of the other human body detecting sensor 302 by one step but maintains the detection distance without a change.

When the number of erroneous detections of the other human body detecting sensor 302 is equal to or more than the second threshold, if the detection area is increased by one step, namely, the detection angle and the detection distance are increased by one step, the number of erroneous detections of the other human body detecting sensor 302 may be increased. However, by only increasing the detection angle by one step, it is possible to prevent the increase of the number of erroneous detections in the other human body detecting sensor 302 while compensating for the reduced detection area of the one human body detecting sensor 302.

Figure 9:
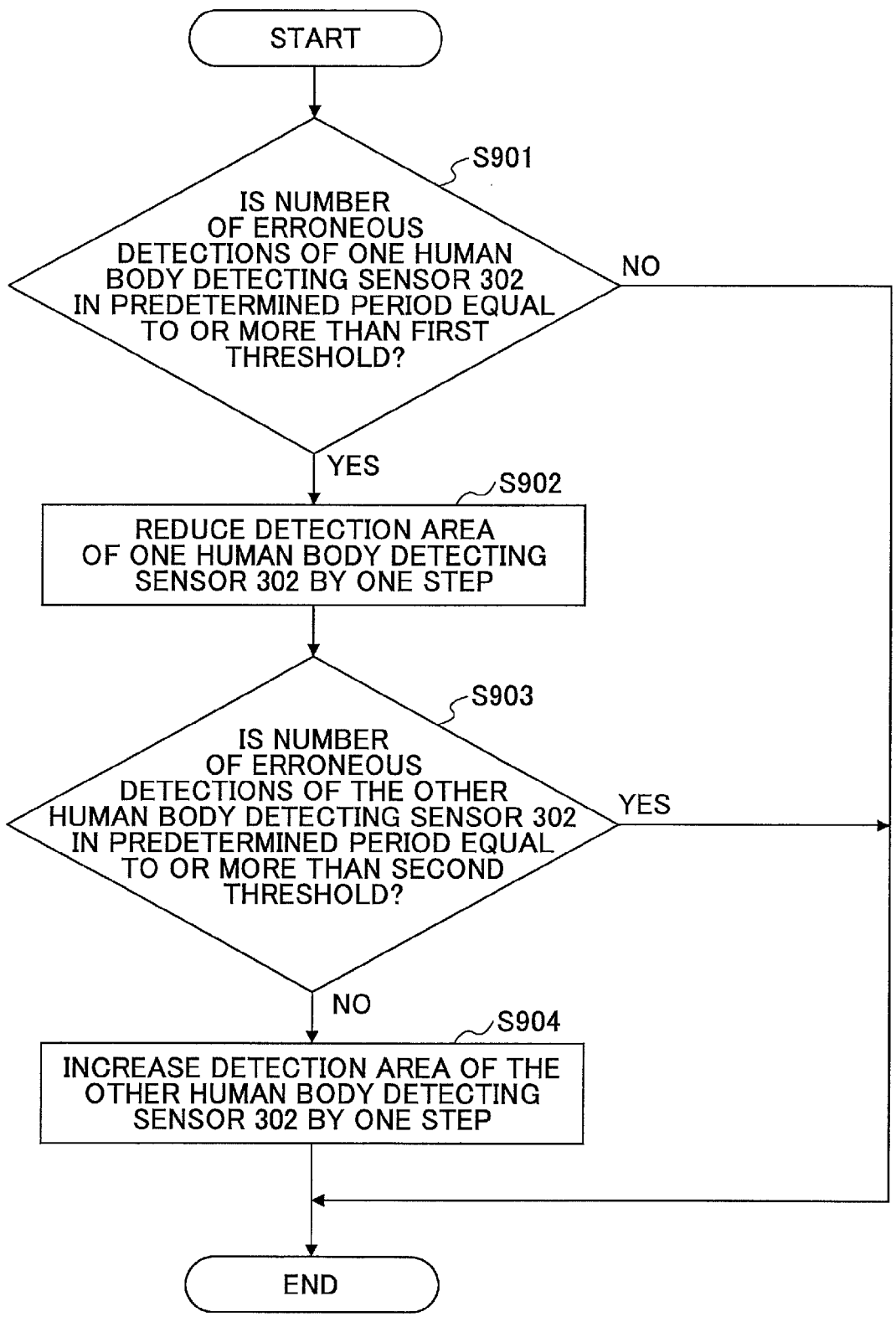
FIG. 9 is a flowchart showing a procedure for adjusting a detection area by the image processing device 1 according to the embodiment.

FIG. 9 is a flowchart showing a procedure for adjusting the detection area by the image processing device 1 according to the embodiment. In the procedure for adjusting the detection area shown in FIG. 9, the number of erroneous detections in a predetermined period is compared with the first threshold and the second threshold. The predetermined period may be a period such as one day, one week, or a one month. Preferably, the user can set the predetermined period in accordance with a usage form of the image processing device 1.

In step S901, the image processing device 1 determines whether the number of erroneous detections of the one human body detecting sensor 302 in a predetermined period is equal to or more than the first threshold, which is the threshold for reducing the detection area. If the number of erroneous detections is less than the first threshold (NO in step S901), the process ends. By contrast, if the number of erroneous detections is equal to or more than the first threshold (YES in step S901), the process proceeds to step S902.

In step S902, the image processing device 1 reduces the detection area of the one human body detecting sensor 302 by one step. Further, the image processing device 1 clears the number of erroneous detections of the one human body detecting sensor 302. In other words, the image processing device 1 sets the number of erroneous detections to 0.

In step S903, the image processing device 1 determines whether the number of erroneous detections of the other human body detecting sensor 302 in the predetermined period is equal to or more than the second threshold.

If the number of erroneous detections is equal to or more than the second threshold (YES in step S903), the process ends. In other words, while the detection area of the one human body detecting sensor 302 is reduced by one step, the detection area of the other human body detecting sensor 302 is not changed.

By contrast, if the number of erroneous detections is less than the second threshold (NO in step S903), the process proceeds to step S904.

In step S904, the image processing device 1 increases the detection area of the other human body detecting sensor 302 by one step.

Figure 10:
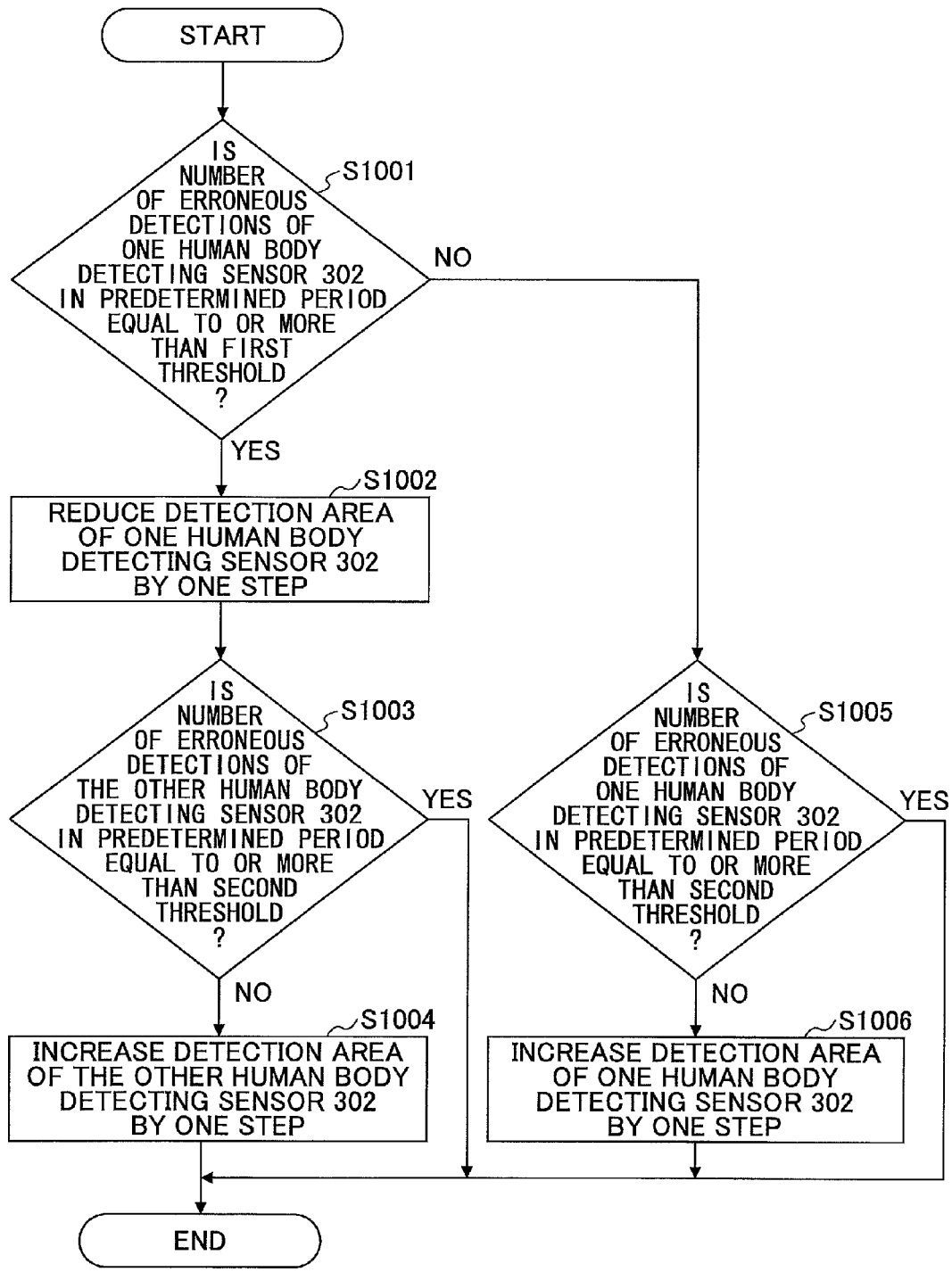
FIG. 10 is a flowchart showing a procedure for adjusting a detection area by the image processing device 1 according to the embodiment.

FIG. 10 is a flowchart showing a procedure for adjusting the detection area by the image processing device 1 according to the embodiment.

Since steps S1001 to S1004 are the same as steps S901 to S904, descriptions thereof are omitted.

The procedure for adjusting the detection area shown in FIG. 10 is different from the procedure for adjusting shown in FIG. 9 in that steps S1005 and S1006 are performed if the number of erroneous detections of the one human body detecting sensor 302 in a predetermined period is less than the first threshold in step S1001 (NO in step S1001).

In step S1005, the image processing device 1 determines whether the number of erroneous detections of the one human body detecting sensor 302 in a predetermined period is equal to or more than the second threshold. If the number of erroneous detections is equal to or more than the second threshold (YES in step S1005), the process ends. By contrast, if the number of erroneous detections is less than the second threshold (NO in step S1005), the process proceeds to step S1006.

In step S1006, the image processing device 1 increases the detection area of the one human body detecting sensor 302 by one step.

By performing the procedure, if the number of erroneous detections is small, namely, less than the second threshold, it is possible to increase the detection area of the one human body detecting sensor 302. In accordance with this, it is possible to accelerate the start of the process to return from the energy-saving mode and reduce a waiting time of the user without increasing the number of erroneous detections.

In the above operation procedure, the detection area is increased or reduced by one step. However, the detection area may be increased or reduced by a plurality of steps such as two steps or three steps.

As shown in FIG. 11, the number of erroneous detections of the one human body detecting sensor 302 may be compared with the first threshold and a reduction width may be determined depending on a number of times exceeding the first threshold (=the number of erroneous detections−the first threshold). In this case, as the reduction width of the one human body detecting sensor 302 becomes wider, an increase width of the other human body detecting sensor 302 may be wider, such that the other human body detecting sensor 302 easily compensates for the detection area of the one human body detecting sensor 302.

For example, if the number of erroneous detections of the one human body detecting sensor 302 in a predetermined period is 22 and the first threshold is 10, the number of times of exceeding the first threshold is 12. In this case, according to FIG. 11, the image processing device 1 reduces the detection area of the one human body detecting sensor 302 by three steps and increases the detection area of the other human body detecting sensor 302 by three steps.

If the number of erroneous detections greatly exceeds the first threshold, it is possible to immediately adjust the detection area in an appropriate manner by substantially changing the detection area.

<Others>

While the preferable embodiment is described above, the present invention is not limited to such an embodiment, but various types of variations or replacements may be added without departing from the scope of the present invention.

In the above embodiment, while the image processing device 1 includes the human body detecting sensor 205, the same or a similar element may be applied to an information processing apparatus other than the image processing device 1 as a matter of course.

Further, in the above embodiment, the process to increase or reduce the detection area and to change the direction is performed based on the number of erroneous detections stored by the erroneous detection determining unit 303, the first threshold, and the second threshold. However, the detection area may be adjusted in proportion to the number of erroneous detections in a number of detections performed by the human body detecting sensor 302.

According to the embodiment, it is possible to provide an information processing apparatus capable of correctly detecting approach of a user, and a storage medium thereof.

Further, the present invention is not limited to these embodiments, and various variations and modifications may be made without departing from the scope of the present invention.

The present application is based on and claims the benefit of priority of Japanese Priority Application No. 2015-055122 filed on Mar. 18, 2015, the entire contents of which are hereby incorporated by reference.

What is claimed is:

1. An information processing apparatus comprising:
    a plurality of human body detecting sensors to detect a presence of a user, wherein each of the plurality of human body detecting sensors form a detection area for detecting the presence of the user; and
    at least one controller configured to
        receive an operation by the user, and
        determine an erroneous detection upon the at least one controller failing to receive the operation by the user within a time period beginning after one of the plurality of human body detecting sensors detects the presence of the user, wherein in response to a plurality of erroneous detections being determined for the one of the plurality of human body detecting sensors and in response to a number of the plurality of erroneous detections being equal to or more than a first threshold, the at least one controller being configured to send an instruction to relatively reduce a size of the detection area of the one of the plurality of human body detecting sensors and being configured to send an instruction to relatively increase a size of the detection area of another one of the plurality of human body detecting sensors, to thereby vary relative size of the detection areas of the plurality of human body detecting sensors in an effort to reduce erroneous detections.

2. The information processing apparatus of claim 1, wherein the at least one controller is configured to send an instruction to relatively increase the detection area of the another one of the plurality of human body detecting sensors to compensate for the relatively reduced detection area of the one of the plurality of human body detecting sensors.

3. The information processing apparatus of claim 1, wherein the at least one controller is configured to compensate for the relatively reduced detection area of the one of the plurality of human body detecting sensors by adjusting a distance and a direction of detecting the human body in the another one of the plurality of human body detecting sensors.

4. The information processing apparatus of claim 1, wherein the at least one controller is configured to send an instruction to relatively increase the detection area to the another one of the human body detecting sensors in response to a number of the plurality of erroneous detections of the another one of the human body detecting sensors being less than a second threshold, the second threshold being relatively smaller than the first threshold.

5. The information processing apparatus of claim 4, wherein the at least one controller is configured to compare the number of the plurality of erroneous detections in a time period with the first threshold and with the second threshold.

6. The information processing apparatus of claim 1, wherein the at least one controller is configured to send an instruction to relatively increase a detection angle and to maintain a detection distance to the another one of the human body detecting sensors in response to a number of the plurality of erroneous detections of the another one of the human body detecting sensors being equal to or more than a second threshold, the second threshold being relatively smaller than the first threshold.

7. The information processing apparatus of claim 1, wherein the at least one controller is configured to send an instruction to relatively increase the detection area to the one of the human body detecting sensors in response to the number of the plurality of erroneous detections of the one of the human body detecting sensors being less than a second threshold, the second threshold being relatively smaller than the first threshold.

8. The information processing apparatus of claim 1, wherein the at least one controller is configured to determine a reduction width of the detection area of the one of the human body detecting sensors in accordance with a difference between the number of the plurality of erroneous detections of the one of the human body detecting sensors and the first threshold, and the at least one controller is configured to determine a relative increase width of the detection area of the other one of the human body detecting sensors in accordance with the reduction width of the detection area of the one of the human body detecting sensors.

9. The information processing apparatus of claim 1, wherein the at least one controller is configured to send the instructions to relatively increase and decrease respective sizes of the detection areas to avoid substantial overlap between detection areas formed by the plurality of human body detecting sensors.

10. The information processing apparatus of claim 1, wherein the at least one controller is configured to send the instructions, to relatively increase and decrease respective sizes, in a plurality of steps.

11. An information processing method comprising:
    detecting a presence of a user via a plurality of human body detecting sensors, each of the plurality of human body detecting sensors forming a detection area for detecting the presence of the user;
    determining an erroneous detection upon at least one controller failing to receive an operation by the user within a time period beginning after detecting, via one of the plurality of human body detecting sensors, a presence of the user; and sending an instruction to relatively reduce a size of the detection area of the one of the plurality of human body detecting sensors and sending an instruction to relatively increase a size of the detection area of another one of the plurality of human body detecting sensors, in response to the determining of a plurality of erroneous detections for the one of the plurality of human body detecting sensors and in response to a number of the plurality of determined erroneous detections being equal to or more than a first threshold, to thereby vary relative size of the detection areas of the plurality of human body detecting sensors in an effort to reduce erroneous detections.

12. A non-transitory computer-readable storage medium storing a computer-readable program to, when executed by an information processing apparatus, causes the information processing apparatus to implement the method of claim 11.

13. The information processing method of claim 11, wherein the sending includes sending an instruction to relatively increase the detection area to the another one of the human body detecting sensors in response to a number of the plurality of erroneous detections of the another one of the human body detecting sensors being less than a second threshold, the second threshold being relatively smaller than the first threshold.

14. The information processing method of claim 11, wherein the sending includes sending an instruction to relatively increase a detection angle and to maintain a detection distance to the another one of the human body detecting sensors in response to a number of the plurality of erroneous detections of the another one of the human body detecting sensors being equal to or more than a second threshold, the second threshold being relatively smaller than the first threshold.

15. The information processing method of claim 11, wherein the sending includes sending an instruction to relatively increase the detection area to the one of the human body detecting sensors in response to the number of the plurality of erroneous detections of the one of the human body detecting sensors being less than a second threshold, the second threshold being relatively smaller than the first threshold.

16. The information processing method of claim 15, further comprising comparing the number of the plurality of erroneous detections in a time period with the first threshold and with the second threshold.

17. The information processing method of claim 11, wherein the determining includes determining a reduction width of the detection area of the one of the human body detecting sensors in accordance with a difference between the number of the plurality of erroneous detections of the one of the human body detecting sensors and the first threshold, and the determining includes determining a relative increase width of the detection area of the other one of the human body detecting sensors in accordance with the reduction of a width of the detection area of the one of the human body detecting sensors.

18. The information processing method of claim 11, wherein the sending of instructions to relatively increase and decrease respective sizes of the detection areas is performed to avoid substantial overlap between detection areas formed by the plurality of human body detecting sensors.

19. The information processing method of claim 11, wherein the sending of the instructions, to relatively increase and decrease respective sizes, includes sending the instructions in a plurality of steps.

20. An information processing system, comprising:
a plurality of information processing apparatuses, each of the plurality of information processing apparatuses including:
a plurality of human body detecting sensors to detect a presence of a user, wherein each of the plurality of human body detecting sensors form a detection area for detecting the presence of the user; and
at least one controller configured to
receive an operation by the user, and
determine an erroneous detection upon the at least one controller failing to receive the operation by the user within a time period beginning after one of the plurality of human body detecting sensors detects the presence of the user, wherein in response to a plurality of erroneous detections being determined for the one of the plurality of human body detecting sensors and in response to a number of the plurality of erroneous detections being equal to or more than a first threshold, the at least one controller being configured to send an instruction to relatively reduce a size of the detection area of the one of the plurality of human body detecting sensors and being configured to send an instruction to relatively increase a size of the detection area of another one of the plurality of human body detecting sensors, to thereby vary relative size of the detection areas of the plurality of human body detecting sensors in an effort to reduce erroneous detections.

21. The information processing system of claim 20, wherein the at least one controller is configured to send an instruction to relatively increase the detection area to the another one of the human body detecting sensors in response to a number of the plurality of erroneous detections of the another one of the human body detecting sensors being less than a second threshold, the second threshold being relatively smaller than the first threshold.

22. The information processing system of claim 21, wherein the at least one controller is configured to compare the number of the plurality of erroneous detections in a time period with the first threshold and with the second threshold.

23. The information processing system of claim 20, wherein the at least one controller is configured to send an instruction to relatively increase a detection angle and to maintain a detection distance to the another one of the human body detecting sensors in response to a number of the plurality of erroneous detections of the another one of the human body detecting sensors being equal to or more than a second threshold, the second threshold being relatively smaller than the first threshold.

24. The information processing system of claim 20, wherein the at least one controller is configured to send an instruction to relatively increase the detection area to the one of the human body detecting sensors in response to the number of the plurality of erroneous detections of the one of the human body detecting sensors being less than a second threshold, the second threshold being relatively smaller than the first threshold.

25. The information processing system of claim 20, wherein the at least one controller is configured to determine a reduction width of the detection area of the one of the human body detecting sensors in accordance with a difference between the number of the plurality of erroneous detections of the one of the human body detecting sensors and the first threshold, and the at least one controller is configured to determine an increase width of the detection area of the other one of the human body detecting sensors in accordance with the reduction width of the detection area of the one of the human body detecting sensors.

26. The information processing system of claim 20, wherein the at least one controller is configured to send the instructions to relatively increase and decrease respective sizes of the detection areas to avoid substantial overlap between detection areas formed by the plurality of human body detecting sensors.

27. The information processing system of claim 20, wherein the at least one controller is configured to send the instructions, to relatively increase and decrease respective sizes, in a plurality of steps.

* * * * *